United States Patent [19]

Kaveloski

[11] 4,112,609
[45] Sep. 12, 1978

[54] PREFABRICATED DISPOSABLE FLY TRAP BLANK

[76] Inventor: Robert J. Kaveloski, 39663 Balboa, Sterling Heights, Mich. 48073

[21] Appl. No.: 796,178

[22] Filed: May 12, 1977

[51] Int. Cl.$^2$ .............................................. A01M 1/10
[52] U.S. Cl. ........................................ 43/118; 43/122
[58] Field of Search ......................... 43/122, 118, 107

[56] References Cited

U.S. PATENT DOCUMENTS

| | | | |
|---|---|---|---|
| 985,840 | 3/1911 | Rockley | 43/118 |
| 1,277,527 | 9/1918 | Allen | 43/118 |
| 1,606,568 | 11/1926 | Gross | 43/107 |
| 3,581,429 | 6/1971 | Hickman | 43/107 |
| 3,959,914 | 6/1976 | Kaveloski | 43/118 |

*Primary Examiner*—N. P. Godici
*Assistant Examiner*—Roscoe V. Parker
*Attorney, Agent, or Firm*—Willis Bugbee

[57] ABSTRACT

A prefabricated approximately T-shaped blank of flexible sheet material with a pair of screened openings spaced apart from one another in the longitudinal portion of the blank is foldable along spaced parallel folded lines into a flat trap structure composed of outer and inner arch-shaped walls with screened skylights therein, the inner screened skylight having a small exit port therein. The structure thus formed has a floor panel with approximate arch-shaped side wings foldable upward therefrom into end closures for the structure, these wings containing small entrance doors near their fold edges. The screens are cemented to the border areas around their respective openings and these cemented areas covered by pairs of half-I-shaped border flaps integral with the blank and folded therefrom over the cemented areas.

10 Claims, 6 Drawing Figures

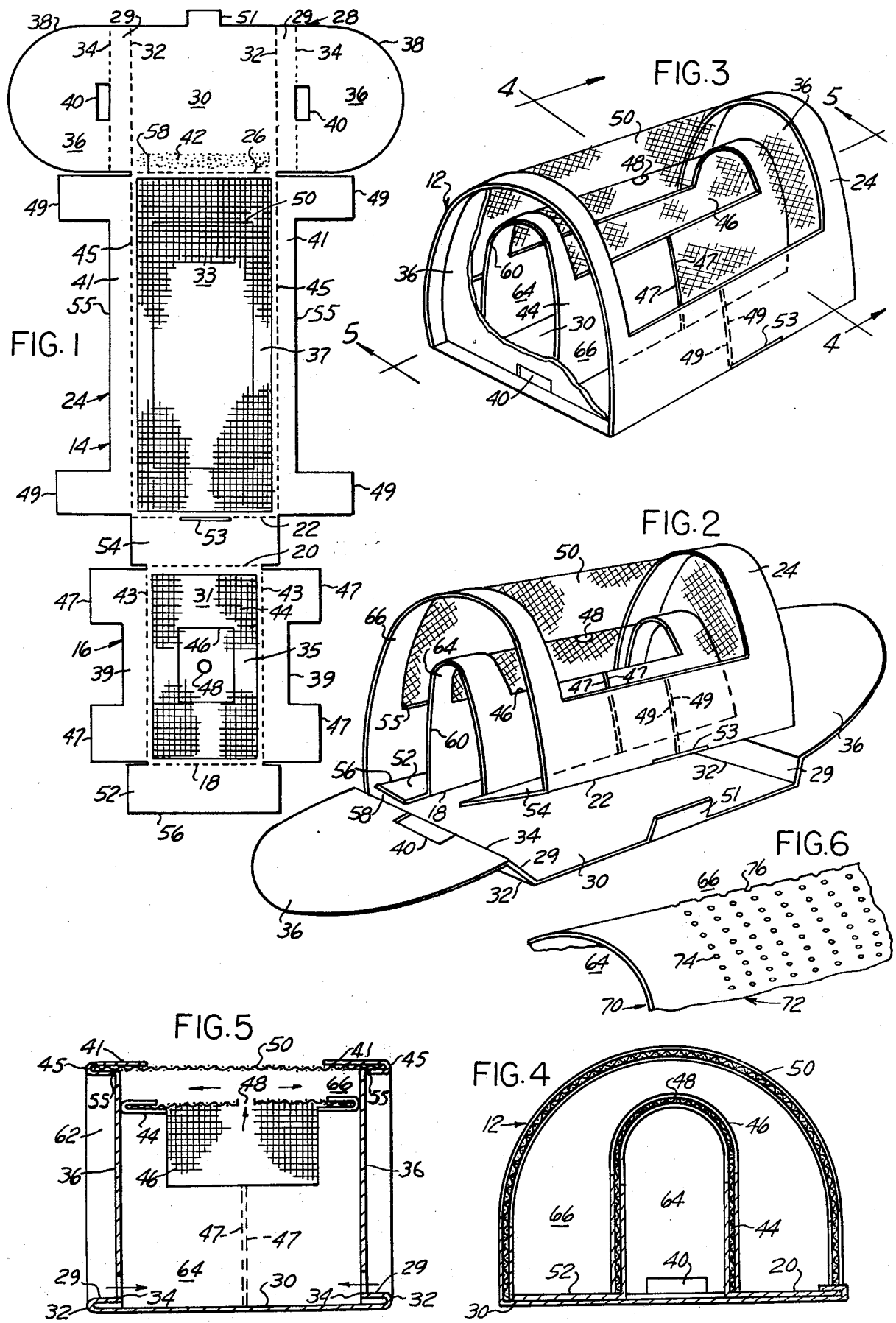

PREFABRICATED DISPOSABLE FLY TRAP BLANK

BACKGROUND OF THE INVENTION

Hitherto, fly traps have been reused repeatedly, so that, even though they are emptied of the dead flies therein, they nevertheless usually contain eggs or maggots which subsequently hatch out, so that the repeatedly-used trap remains contaminated. Moreover, often a week elapses between successive garbage collections, during which period more maggots or eggs contained in the discarded contents of the trap hatch into more flies which escape to breed again. In the manufacture of my disposable fly trap disclosed and claimed in my previous U.S. Pat. No. 3,959,914 issued June 1, 1976 for Prefabricated Disposable Fly Trap, it was found that after cementing the screen to the border areas around the respective openings in the blank, surplus cement was exuded through the border portions of the screen mesh material and adhered to the machinery. The present invention successfully solves this problem.

SUMMARY OF THE INVENTION

This prefabricated blank is quickly and easily folded into a disposable fly trap which, when filled with flies, is immediately destroyed along with its contents or placed in the garbage or trash can for collection, and is never emptied or reused. It is normally and initially in the form of a prefabricated flat sheet blank which is easily packed, shipped and stored, yet is quickly and easily folded into a complete fly trap ready for use. Enticed by a suitable bait, the fly enters one of the small end doors in one of the end walls and finds himself in an arch-shaped inner compartment with a screened skylight at its top containing a small exit port. The existence of the darkness in the lower portion of this inner compartment contrasts with the lighted lower and upper skylights, the light from which lures the fly upward through the exit port into the outer chamber between the outer and inner arch-shaped walls. Since the only exit from this outer chamber is back through the small inner skylight port, the fly is unlikely to find it and consequently becomes trapped in this outer chamber.

The present invention principally resides in the provision of the pairs of half-I-shaped border flaps which overlie the cemented borders of the screen panels around the inner and outer skylight openings. These border flaps not only conceal the cemented areas and prevent contamination of the production machinery by the cement but also reinforce and consequently strengthen the ends of the upstanding fly trap side walls and provide stop shoulders which act as detents holding the end walls from slippage.

In the drawing,

FIG. 1 is a top plan view of a pre-fabricated flat blank which is foldable into a disposable fly trap, according to one form of the invention;

FIG. 2 is a perspective view of the prefabricated blank of FIG. 1 at an intermediate stage partly folded into the disposable fly trap shown in FIG. 3;

FIG. 3 is a perspective view, similar to FIG. 2, but with the prefabricated blank completely folded into its final form of disposable fly trap, with one of the end walls broken away to disclose the inner and outer side walls and screened skylights forming inner and outer compartments and parts behind it;

FIG. 4 is a vertical cross-section, taken along the line 4—4 in FIG. 3;

FIG. 5 is a vertical longitudinal section, taken along the line 5—5 in FIG. 3; and FIG. 6 is a fragmentary top plan view of a portion of a modified skylight.

Referring to the drawing in detail, FIG. 1 shows a prefabricated disposable fly trap blank, generally designated 10, which is subsequently folded, as shown in FIG. 2, into the double-walled, double-compartmented disposable fly trap 12 with screened inner and outer skylights, as shown in FIG. 3. The blank 10 is an approximately T-shaped sheet of stiff but flexible sheet material with an elongated longitudinal portion 14 subdivided into an approximately I-shaped lower end portion or panel 16 with parallel inner fold lines 18 and 20 and an upper fold line 22 which divides the I-shaped longitudinal end panel 16 from a larger approximately I-shaped intermediate panel 24. The latter terminates in an upper fold line 26 separating it from a transverse end panel 28. The transverse end panel 28 which approximately resembles the cross bar of a T has a central rectangular base or floor panel 20 separated at its opposite ends by two fold lines 32 and 34 defining therebetween spacing strips 29 separating the floor panel 30 from a pair of approximately arch-shaped end wings 36 with arcuate edges 38. Each of the end wings 36 adjacent its fold line 34 has a small entrance doorway 40. The central rectangular portion 30 adjacent the fold line 26 preferably is provided with an adhesive layer 42 of elongated rectangular shape.

The shorter central part of panel 44 of the approximately I-shaped lower portion 16 subsequently forms the inner side wall of the fly trap 12 and is provided with a small rectangular screened opening 46 containing a tiny central aperture 48 and subsequently forming an inner lower skylight 46, whereas the larger approximately I-shaped portion 24 contains a longer and wider rectangular screened opening 50 subsequently forming an outer upper skylight 50. Wire mesh, plastic mesh or textile mesh screening is suitable for covering the openings 46 and 50 by forming the outer and inner screen panels 31 and 33 overlapping the border areas 35 and 37 therearound. The I-shaped lower portion 16 is composed of a central panel 44, a bridge portion or strip 54 connected at the fold lines 20 and 22 to the panel 24, and an attachment strip or tab 52 connected to the central panel 44 at the fold line 18.

The smaller end panel 16 and the larger intermediate panel 24 are provided with half-I-shaped opposite side border flaps 39 and 41 respectively (FIG. 1) integral therewith and foldable relatively thereto along the dotted fold lines 43 and 45 respectively. These opposite side flaps 39 and 41 when folded inward along their respective fold lines 43 and 45 over their respective open-centered rectangular border portions 35 and 37 and over the corresponding overlapping portions of the screen panels 31 and 33 relatively to the respective openings 46 and 50, cover up the adhesive, such as cement or glue, used in securing the screen panels 31 and 33 to their respective border portions 35 and 37. When so folded, the border flaps 39 and 41 have their corner side edges 47 and 49 substantially meeting one another, as shown in FIGS. 2 and 3. The floor panel portion 30 of the transverse end panel 28 is provided with an outwardly-projecting tab 51 which in the assembled position of the fly trap 12 fits into and projects through a slot 53.

The prefabricated blank 10 of FIG. 1 is manufactured under mass production procedures by being die-cut into the shape shown in FIG. 1 from a continuous strip of thin cardboard or sheet plastic fed from a roll of the same material. After such die-cutting to the outline shown in FIG. 1 and with the openings 46 and 50 and the slot 53 formed therein during the same blanking operation, the screen panels 31 and 33, which have been previously cut to the proper sizes adapted to overlap the border portions 35 and 37, are cemented, glued, heat-sealed or otherwise adhesively attached to their respective panels 16 and 24 in overlapping relationship to their border portions 35 and 37. The side flaps 39 and 41 are then folded inward and downward toward one another along their respective fold lines 43 and 45 and then pressed firmly down upon the border portions of their respective screen panels 31 and 33 so that their respective corner side edges 47 and 49 come into substantial abutting engagement with one another in their respective lower and intermediate panels 16 and 24. At the same time, this procedure covers up any adhesive which has seeped through the meshes of the screen panels 31 and 33 and prevents the adhesive from adhering undesiredly to subsequent machinery or to other blanks 10. The folded-over side flaps 39 and 41 also reinforce the panels 16 and 24 at the opposite edges of their respective openings 46 and 50, since they become adhesively secured to the border portions of the screen panels 31 and 33 and to the border portions 35 and 37 of the panels 16 and 24 by the same adhesive employed in securing the screen panels 31 and 33 to their respective panels 16 and 24 over their respective openings 46 and 50. The side edges 55 of the folded side flaps 41 form stop shoulders which act as detents holding the end wings 36 from unfolding (FIG. 5).

The folding and assembling of the prefabricated blank 10 of FIG. 1 into the completed disposable fly trap 12 of FIG. 3 takes place in the manner shown at an intermediate stage in FIG. 2. In so doing, the operator first folds upward from the plane of the flat prefabricated blank 10 of FIG. 1 the outer rectangular attachment strip or tab 52 of the I-shaped part 16 along the fold line 18. He then folds the rectangular portion 44 into upwardly-arched arcuate form along the fold line 20, after which he folds the inner rectangular bridge portion 54 along the fold lines 20 and 22 so that the portions 44 and 24 are fed temporarily approximately perpendicular to the bridge portion 54.

With the prefabricated blank 10 thus preliminarily folded, he then pulls the panels 44 and 24 into approximately concentric arch-shaped form as shown in FIG. 2, at the same time folding the panel 24 relatively to the floor panel 30 along the fold line 26. He then pushes the outer edge 56 of the attachment strip or tab 52 against the fold line 26 and secures it to the floor panel 30 by pressing it downward against the adhesive area 42. The relative positions of the component parts of the fly trap 12 now occupy the approximate positions shown in FIG. 2.

To complete assembly of the fly trap 12 from the intermediate position of FIG. 2 to the final position of FIG. 3, the operator now swings the rectangular portion 54 downward against the edge 68 opposite the fold line 26 and staples or adhesively secures the portion 52 and 54 against the rectangular floor portion or panel 30 adjacent the opposite edges 58 and 68 thereof.

The fly trap is then baited by placing meat, garbage or other fly-attracting material on the floor panel 30 in the inner compartment 64 formed by the inner portion 44. The operator now completes the assembly by folding the end wings 36 upward around their respective fold lines 32 and 34 into detent engagement with the end edges 60 formed at the fold lines 43 of the border flaps 39 with the panel 44, thereby obtaining the completed fly trap 12 shown in FIG. 3.

In use, the flies, attracted by the bait inside the trap 12, enter through the small end doorways 40 into the inner compartment or chamber 64, whence they are attracted upward by the light streaming downward through the screened skylights 46 and 50, eventually making their way to and through the tiny exit port 48, whence they arrive in the outer chamber 66, lighted by the screened upper skylight 50. Here they are trapped, because the only way out of the outer compartment 66 is backward through the tiny exit port 48 into the inner compartment 64 and thence outward through one of the small end doors 40—a route which practical experience with this fly trap 12 has proved that the fly is almost entirely unable or unwilling to follow, especially when it means going from a brightly lighted space into the dark space in order to reach one of the small end doors 40.

When a sufficient number of flies have been thus trapped, the user disposes of the entire trap by placing it in a garbage can or trash can or bag. He then replaces it with another disposable fly trap 12, whereupon the foregoing procedure and operation are repeated.

In the modified wall 70 of FIG. 6, which may be either the inner or outer arch-shaped wall but is shown as the inner wall, the wall 70 is provided with a cluster 72 containing a multiplicity of tiny openings 74, such as perforations or slot disposed in close proximity to one another. These openings 74 are individually too small or too narrow for the passage of an average house fly, but in their totality they transmit enough light collectively to lure such flies upward through the fly exit port 76 from the inner chamber 64 to the outer chamber 66.

I claim:

1. A prefabricated blank adapted to be folded into a disposable fly trap, said blank comprising
an elongated approximately T-shaped member of flexible sheet material including
a longitudinal end panel adapted to be folded at a first predetermined fold location into an arch-shaped inner wall of the fly trap and thereby to define an inner fly trap chamber,
a bridge portion disposed adjacent said longitudinal end panel and adapted to be folded relatively thereto at a second predetermined fold location,
a longitudinal intermediate panel disposed adjacent said bridge portion and adapted to be folded relatively thereto at a third predetermined fold location into an arch-shaped outer wall of the fly trap disposed in outwardly-spaced relationship to the arch-shaped inner wall thereof and to define therebetween an outer fly trap chamber,
each of said above-mentioned panels having therein a light-transmitting opening with a border portion adjacent thereto and a fly restraining network screen extending across said opening and having a peripheral portion overlapping said border portion and secured thereto,
each of said panels having border portion covering means movable into superimposed relationship with the respective border portion thereof and also with the respective overlapping screen peripheral portion, said longitudinal end panel having a fly exit port therein adapted in the arch-shaped folded positions of said panels to lead from the inner chamber to the outer chamber, and a transverse end panel disposed adjacent said longitudinal intermediate panel and adapted to be folded relatively thereto at a fourth predetermined fold location into a floor wall of the fly trap, said transverse end panel having at its opposite ends arch-shaped wings to be folded upward into end-closing relationship with the opposite ends of the inner and outer arch-shaped walls, one of said wings having a fly entrance doorway therein adapted in the folded condition of the blank to lead from the exterior of the trap into the inner chamber thereof.

2. A prefabricated blank adapted to be folded into a disposable fly trap, according to claim 1, wherein said border portion covering means comprises a flap device hingedly connected to its respective panel along at least one edge thereof.

3. A prefabricated blank adapted to be folded into a disposable fly trap, according to claim 2, wherein said flap device includes a pair of open-centered flaps, each flap being connected to an edge of its respective panel on the opposite side thereof from the connection of the remaining flap of said pair.

4. A prefabricated blank adapted to be folded into a disposable fly trap, according to claim 3, wherein each of said flaps is of approximately half-I-shaped configuration.

5. A prefabricated blank adapted to be folded into a disposable fly trap, according to claim 1, wherein said overlapping screen peripheral portion is adhesively secured to said panel border portion.

6. A prefabricated blank adapted to be folded into a disposable fly trap, according to claim 5, wherein said border portion covering means is also adhesively secured to said panel border portion.

7. A fly trap, comprising a floor panel of sheet material, an outer arch-shaped wall secured to said floor panel and having an outer light transmitting opening in the upper portion thereof, an inner arch-shaped wall secured to said floor panel in inwardly-spaced relationship to said outer arch-shaped wall and having an inner light-transmitting opening in the upper portion thereof, each of said walls having a border portion adjacent its respective opening, each of said openings having a network screen extending thereacross and having a peripheral portion overlapping said border portion and secured thereto, each of said walls having border portion covering means disposed in superimposed relationship with the respective border portion thereof and with the respective overlapping screen peripheral portion, said inner wall having a fly exit port therein facing said outer light-transmitting opening, and an arch-shaped end wall disposed at each of the opposite ends of said outer and inner arch-shaped walls in closing relationship therewith, at least one of said end walls having a fly entrance doorway therein.

8. A fly trap, according to claim 7, wherein said border portion covering means comprises a flap device hingedly connected to its respective panel along at least one edge thereof.

9. A fly trap, according to claim 8, wherein said flap device includes a pair of open-centered flaps, each flap being connected to an edge of its respective panel on the opposite side thereof from the connection of the remaining flap of said pair.

10. A fly trap, according to claim 9, wherein each of said flaps is of approximately half-I-shaped configuration.

* * * * *